(No Model.)
J. B. GENIN.
PLANER TOOTH FOR SAWS.
No. 257,936. Patented May 16, 1882.
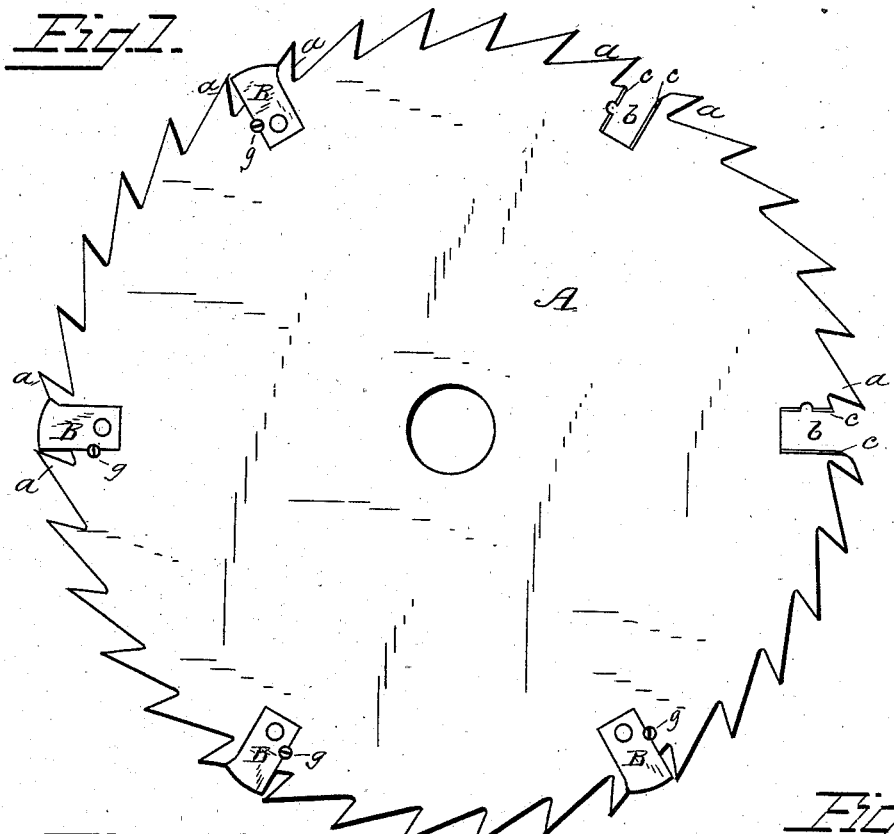
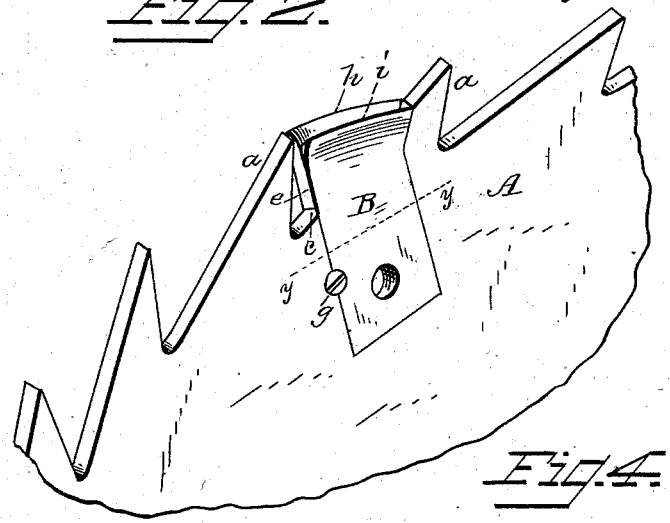
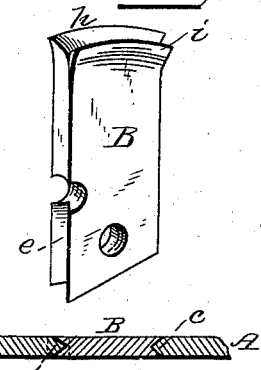
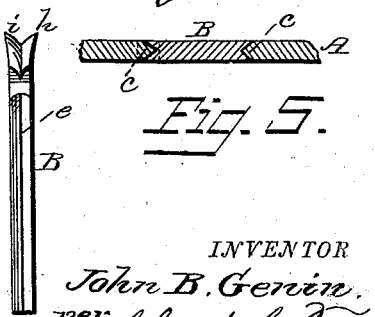
WITNESSES
Franck L. Ourand
Wm L. Speiden
INVENTOR
John B. Genin
per Chas. H. Fowler
Attorney

UNITED STATES PATENT OFFICE.

JOHN B. GENIN, OF WORCESTER, MASSACHUSETTS.

PLANER-TOOTH FOR SAWS.

SPECIFICATION forming part of Letters Patent No. 257,936, dated May 16, 1882.

Application filed December 23, 1881. (No model.)

*To all whom it may concern:*

Be it known that I, JOHN B. GENIN, a subject of Great Britain, residing in Worcester, county of Worcester, and State of Massachusetts, have invented a new and useful Improvement in Planer-Teeth for Circular Saws; and I do hereby declare that the following is a full, clear, and exact description of the same, reference being had to the accompanying drawings, in which—

Figure 1 is a side elevation of a circular saw embodying my invention; Fig. 2, a detail view thereof on an enlarged scale; Fig. 3, a perspective view of one of the planer-teeth; Fig. 4, an edge view thereof, and Fig. 5 a sectional view taken on line $y\,y$ of Fig. 2.

The present invention has relation to certain new and useful improvements in that class of planer-teeth connected to circular saws, whereby the work is smoothed or planed at the same time it is sawed.

The object of the invention is to provide such a tooth with cutting-edges that will operate on both sides of the saw in a perfect and effective manner to smooth or plane the work, which object I attain by the construction substantially as shown in the drawings and hereinafter described.

In the accompanying drawings, A represents the circular saw, of the ordinary construction, with the teeth $a$, which are also of the usual form. At suitable intervals around the outer edge or periphery of the saw are open recesses $b$, having V-shaped edges $c$, to form a seat for similarly-shaped grooves $e$ on the edges of the planer-tooth B, said tooth being held within the recess $b$ by screw $g$ or other convenient means. The tooth B, at its outer end, is formed with cutting-edges $h\,i$, the front edge of the tooth being inside the extremity of a saw-tooth and curving backward and outward to near the outer end of the succeeding saw-tooth, as shown more clearly in Fig. 2.

I do not desire to be understood as limiting myself to any particular number of planer-teeth used, as the number employed will depend much on the size of the saw, and I reserve the right to use any of the ordinary means for securing the planer-teeth to the saw, as it is evident that any convenient means may by employed without departing from the spirit of my invention.

Having now fully described my invention, what I claim as new, and desire to secure by Letters Patent, is—

The combination, with a circular saw, of the planer-teeth B, formed with cutting-edges $h\,i$, curved as shown with relation to the saw-teeth—that is, the front edge of the planer-tooth being inside the extremity of a saw-tooth and curving backward and outward to near the outer end of the succeeding saw-tooth, substantially as and for the purpose set forth.

JOHN B. GENIN. [L. S.]

Witnesses:
PAUL BROUSSEAU,
JAS. G. ARNOLD.